J. NEUSTAEDTER.
TOOL CHEST HANDLE.
APPLICATION FILED MAY 17, 1913.
1,074,133.
Patented Sept. 30, 1913.
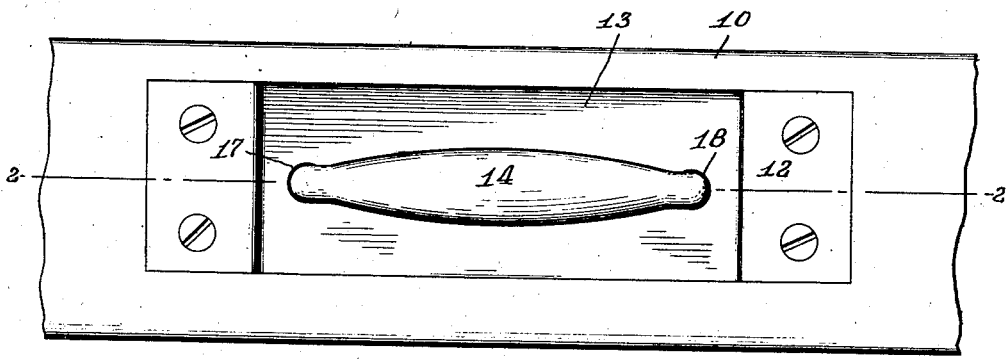
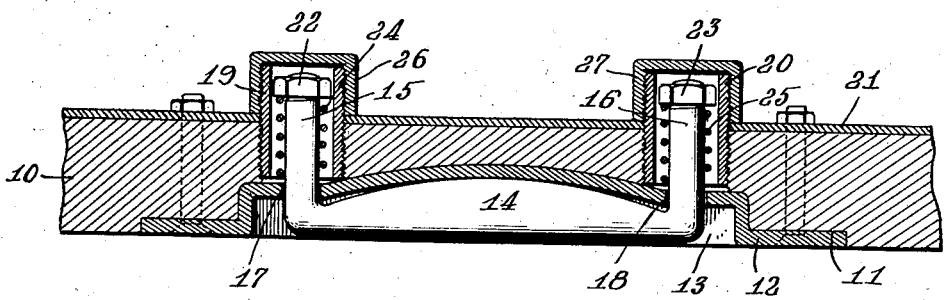
Inventor
John Neustaedter

UNITED STATES PATENT OFFICE.

JOHN NEUSTAEDTER, OF VALLEY CITY, NORTH DAKOTA.

TOOL-CHEST HANDLE.

1,074,133.   Specification of Letters Patent.   Patented Sept. 30, 1913.

Application filed May 17, 1913. Serial No. 768,308.

*To all whom it may concern:*

Be it known that I, JOHN NEUSTAEDTER, a citizen of the United States, residing at Valley City, in the county of Barnes and State of North Dakota, have invented new and useful Improvements in Tool-Chest Handles, of which the following is a specification.

This invention has reference to an improved handle for tool chests, trunks, and other receptacles of like character, the object of this invention being to provide a handle which under normal conditions will lie flush with the wall of the receptacle to which it is secured, and at the same time allow the same to be readily drawn out beyond the wall when it is desired to change the position of the receptacle in question.

A further object is to provide means for quickly retracting the handle when not in use, and to insure its remaining in normal position flush with the walls.

One advantage resulting from positioning the handle flush with the wall of the receptacle is that the handle is prevented from being broken off by contact with other objects, a condition constantly occurring in receptacles designed for transportation purposes where the wear and tear is very great due to rough treatment by careless employees and other well-known causes.

A further advantage is that receptacles provided with the improved handles may be packed more closely together than has heretofore been possible, resulting in a saving of large space and consequently increasing the capacity of the storage room or express car as the case may be.

A structural embodiment of the present invention is illustrated in the accompanying drawing, in which, Figure 1 is a plan showing the handle secured to the wall. Fig. 2 is a section on the line 2—2 of Fig. 1.

Referring to the drawing, 10 designates the wall to which the handle is secured, and is provided with a recess 11 in which is fastened the plate 12 by any suitable means. The said plate 12 is formed with a central recess 13 to provide a chamber for the handle 14 when in its normal position; the inner wall of the recess so formed is curved slightly to conform with the shape of the handle 14. The recess 13 extends a considerable distance beyond either side of the handle 14 to accommodate the fingers for grasping the handle to draw it out into operative position as hereinafter described. As is common, the opposite ends of the handle terminate in inwardly extending arms 15 and 16 which pass through apertures 17 and 18 in the recessed portion of the plate 12, and pass into the tubular casings 19 and 20 screwed in the wall of the receptacle and projecting some distance beyond the inner face thereof. To obtain a greater tensile strength and to prevent the inner wall from being mutilated a protecting plate 21 is secured thereto. Nuts 22 and 23 are secured on the ends of the inwardly extending arms of the handle 14 and bear against coil springs 24 and 25 on the said arms, the outer end of which engage the inner face of the plate 12. To protect the device from inside interference, the screw caps 26 and 27 are provided on the projecting portions of the tubular casings 19 and 20. It will be noted that the springs 24 and 25 exert their pressure on the nuts 22 and 23 and thus maintain the handle normally in a position flush with the outer face of the wall of the receptacle.

When it is desired to change the position of the receptacle, the handle is grasped and is pulled outwardly against the tension of the springs. When released the handle immediately drops into its former position because of the inward pull of the springs on the nuts. It will thus be seen that the maintenance of the handle in a position flush with the wall of the receptacle is positively assured, thus protecting the same from outside interference and possible breakage. There is also effected a great saving of space, an item of considerable importance in the case of receptacles designed for shipment where the capacity of the carrier is limited. It is to be understood, however, that the use of the handle is not limited to receptacles but may be employed in connection with numerous other articles, as, for instance, trap doors and in other places where economy of space and positive assurance against breakage is desired.

What I claim is,—

1. The combination with a wall, of a recess in said wall, tubular casings in said wall and extending inwardly from said recess, a handle having arms extending into said tubular casings, nuts on the ends of said arms, and spring means actuating pressure on said nuts to maintain the handle in said recess and flush with said wall.

2. The combination with a wall, of a handle therefor, a recess in said wall, said recess being formed with an inwardly curved portion conforming with the shape of said handle whereby the handle lies flush with the wall, tubular casings extending inwardly from said recess, said handle having arms projecting into said tubular casings, nuts on the ends of said arms, and spring means encircling the arms and actuating pressure inwardly on said nuts to maintain the handle in said recess and flush with said wall.

3. The combination with a wall, of a recess in the outer face of said wall, a protecting plate on the inner face of said wall, tubular casings extending from said recess through the wall and projecting beyond said protecting plate, a handle having arms extending into said tubular casings, and spring means in the tubular casings for maintaining said handle in said recess and flush with the wall.

4. The combination with a wall, of a recess in the outer face of said wall, a protecting plate on the inner face of said wall, tubular casings extending from said recess through the wall and projecting beyond the protecting plate, caps on said projections, a handle having arms, extending into said tubular casings and spring means in the tubular casings for maintaining said handle in said recess and flush with said wall.

In testimony whereof I have hereunto set my hand in presence of two subscribing witnesses.

JOHN NEUSTAEDTER.

Witnesses:
   Fred Fredrickson,
   David S. Rililur.